United States Patent
Lemmon et al.

(10) Patent No.: US 12,524,466 B1
(45) Date of Patent: Jan. 13, 2026

(54) MAID GRAPH CONSTRUCTION USING MACHINE LEARNING

(71) Applicant: LiveRamp, Inc., San Francisco, CA (US)

(72) Inventors: John Lemmon, North Little Rock, AR (US); Matthew Tichenor, San Antonio, TX (US)

(73) Assignee: LiveRamp, Inc., San Francisco, CA (US)

( * ) Notice: Subject to any disclaimer, the term of this patent is extended or adjusted under 35 U.S.C. 154(b) by 55 days.

(21) Appl. No.: 18/426,003

(22) Filed: Jan. 29, 2024

Related U.S. Application Data (60) Provisional application No. 63/442,365, filed on Jan. 31, 2023.

(51) Int. Cl.
*G06F 16/84* (2019.01)
*G06F 16/901* (2019.01)

(52) U.S. Cl.
CPC .......... *G06F 16/9024* (2019.01); *G06F 16/84* (2019.01)

(58) Field of Classification Search
CPC ................................................. G06F 16/84–88
See application file for complete search history.

(56) References Cited

U.S. PATENT DOCUMENTS

| | | | | |
|---|---|---|---|---|
| 8,438,184 B1 * | 5/2013 | Wang | ...................... | H04L 67/02 707/780 |
| 12,074,965 B1 * | 8/2024 | Griffin | .................. | H04L 9/3239 |
| 2004/0059712 A1 * | 3/2004 | Dean | ...................... | G06Q 30/02 |
| 2005/0154696 A1 * | 7/2005 | Gutsche | ................ | G06F 16/289 |
| 2007/0073585 A1 * | 3/2007 | Apple | ................. | G06Q 30/0247 705/14.46 |
| 2008/0195468 A1 * | 8/2008 | Malik | .................... | G06Q 30/02 705/14.67 |
| 2011/0218866 A1 * | 9/2011 | Wilson | ................... | G06Q 30/02 705/14.73 |
| 2015/0264438 A1 * | 9/2015 | Cox | ................. | H04N 21/25883 725/10 |

(Continued)

FOREIGN PATENT DOCUMENTS

| | | | | |
|---|---|---|---|---|
| EP | 4191501 A1 * | 6/2023 | ......... | G06F 16/9035 |
| WO | 2022251732 A2 | 12/2022 | | |

OTHER PUBLICATIONS

Ovum, "Ovum Market Radar: Customer Data Platforms," downloaded from https://www.redpointglobal.com/wp-content/uploads/2020/02/CDP-Market-Radar-Ovum-2020.pdf (Nov. 5, 2019).

*Primary Examiner* — Robert W Beausoliel, Jr.
*Assistant Examiner* — Nirav K Khakhar (57) ABSTRACT

A system for matching personal identifiers (PIDs) to Mobile Ad Identifiers (MAIDs) allows multiple PIDs to be associated with each MAID by constructing a data graph structure, with weights assigned to representing the likelihood of each of the persons associated with each of the PIDs to be using the device associated with a MAID at a given time. The graph is constructed by a machine learning model that ranks PIDs by which is most likely to be seen in the near future using the device to which the MAID is associated. These results are then converted into probabilities. MAIDs are represented as nodes in the graph, while probabilities are stored as edges.

20 Claims, 7 Drawing Sheets

(56) References Cited

U.S. PATENT DOCUMENTS

| | | | |
|---|---|---|---|
| 2016/0142754 A1* | 5/2016 | Kouritzin | H04H 60/45 |
| | | | 725/14 |
| 2016/0180388 A1* | 6/2016 | Koran | G06Q 30/0255 |
| | | | 705/14.53 |
| 2017/0034591 A1* | 2/2017 | Ray | H04N 21/2668 |
| 2019/0095601 A1* | 3/2019 | Chan | G06F 21/32 |
| 2020/0126117 A1* | 4/2020 | White | G06Q 30/0251 |
| 2020/0151771 A1* | 5/2020 | Wiener | G06Q 30/0255 |
| 2020/0228922 A1* | 7/2020 | Jenkins | H04W 4/33 |
| 2020/0401886 A1* | 12/2020 | Deng | G06N 3/088 |
| 2021/0006630 A1* | 1/2021 | Miller | H04L 67/535 |
| 2021/0012378 A1* | 1/2021 | Demsey | H04L 67/04 |
| 2021/0279767 A1* | 9/2021 | Hartzell | H04W 4/023 |
| 2021/0297739 A1* | 9/2021 | Manus | H04N 21/2407 |
| 2022/0182790 A1* | 6/2022 | Skory | G06F 16/906 |
| 2022/0187437 A1* | 6/2022 | Usaj | G01S 13/04 |
| 2022/0386067 A1* | 12/2022 | Donaire | H04W 4/021 |
| 2023/0087758 A1* | 3/2023 | Tapse | H04L 65/1066 |
| | | | 370/252 |
| 2023/0155707 A1* | 5/2023 | Adyanthaya | H04H 60/70 |
| | | | 455/456.3 |
| 2023/0188583 A1* | 6/2023 | Blanco | H04L 65/1073 |
| | | | 709/231 |

\* cited by examiner

MAID GRAPH CONSTRUCTION USING MACHINE LEARNING

CROSS-REFERENCE TO RELATED APPLICATIONS

This application claims the benefit of U.S. provisional patent application No. 63/442,365, filed on Jan. 31, 2023. Such application is incorporated herein in its entirety.

BACKGROUND OF THE INVENTION

Mobile Ad Identifiers (MAIDs) are unique, anonymous alphanumeric identifiers assigned by an operating system (such as Apple IOS or Google Android) to individual user devices, including but not limited to mobile phones. MAIDs may be used for a number of purposes, including the targeting of messages to persons or audiences of persons with certain desired characteristics.

Services also exist that assign personal identifiers (PIDs). A PID is a unique, anonymous alphanumeric identifier assigned to individual persons, households, or businesses. For example, LiveRamp Corporation of San Francisco, California uses its RampID® service for this purpose. MAIDs and PIDs do not necessarily correspond to a particular combination of a user and user device. For example, a single user may (and often does) operate multiple separate devices that interact across the Internet with other systems. A person may, for example, operate a mobile phone, a tablet device, a personal computer, and a connected television (CTV) device. Likewise, it may occur that multiple individual persons interact through a common user device. For example, multiple persons in a household may watch television programming over the same CTV device, either watching at the same time or watching separately at different times. A related issue is that multiple individual persons may use the same identifier for interacting across the Internet with other devices. For example, multiple persons (such as persons in a family) may use the same email address by sharing an email account. In cases when a hashed email address is used as an identifier, multiple different persons may mistakenly be mapped to a single person in such case.

A common solution to the problem of matching MAIDs and PIDs in order to assign persons to particular activities is to simply assign a single PID to each MAID, representing a single person that owns the device. This approach solves the problem of a single person using multiple devices, because the same PID will be matched to each of the MAIDs for these devices in such case. This approach does not, however, address the problem of multiple persons using a common device. Attempts have been made to address this issue in the CTV space, since it is very common for multiple different persons in the same household to watch television programming through the same device. In general, these solutions use probabilistic methods (i.e., attempting to mathematically model which person in the household might be using the CTV device in the future), rather than relying on actual usage in order to determine which user is in fact using the device.

References mentioned in this background section are not admitted to be prior art with respect to the present invention.

SUMMARY OF THE INVENTION

The present invention, in various embodiments, provides a solution to the problems previously described. Instead of matching a single PID to each MAID, multiple PIDs may be associated with each MAID by constructing a data graph structure, with weights assigned to representing the likelihood of each of the persons associated with each of the PIDs to be using the device at a given time. The graph is constructed by a machine learning model that ranks PIDs by which is most likely to be seen in the near future. These results are then fed into a function, such as in some embodiments a SoftMax function, which converts the numbers into probabilities. MAIDs are represented as nodes in the graph, while probabilities are stored as edges.

It may be seen then that the solution presented by the invention is a deterministic solution rather than the prior art probabilistic solutions, because the association of a PID to a particular MAID at a particular time is based on the identity of the person who has actually been using the device in the associated timeframe. In addition, the use of a simple numerical score in a graph data structure reduces the computational complexity of processes using the graph for various applications including audience messaging, thereby rending certain operations computationally feasible that would not otherwise be practical to perform. This is because the raw number of MAID-PID connections is reduced to a single numerical score per edge in this new data structure. In typical use case examples, the previous necessity of processing Terabytes of data is reduced to Gigabytes of data. Thus the invention facilities computational efficiency improvements at three orders of magnitude, rendering certain previously impractical computations feasible, in certain embodiments.

Prior art methods assign only one "best" identity to a MAID in order to reduce the scale of data that gets processed. This new method creates edge scores that allows the system to consolidate all the raw data about a MAID-PID edge into a single comparable number. That allows the system to better match customer data to this graph (now larger with additional PIDs) without having to process all the raw data around timestamps and connections. In the past, the raw features used to train the machine learning algorithm could have been used to make decisions downstream, but that would require an inordinate amount of computing power. Instead, without these scores, the problem is simplified by selecting only a single PID per MAID at the beginning of the process. This means that the Terabytes previously required would be reduced to a scale of Gigabytes, but also means throwing out two-thirds of the data. In other words, previous attempts to reduce the computational difficulty of the problem result in a less optimal solution because they utilize less data.

Furthermore, prior art methods to use hashed email to identify a unique identity but this leads to under-consolidation as identities may have many emails associated with them. By using PIDs instead of hashed emails directly, the system is able to consolidate an identity to get a better picture of the entity's use of a device. These PIDs are identity fragments where a single fragment doesn't entirely identify a single person. So this new approach lets the system identify all the useful PIDs (identity fragments) for a MAID while still only keeping deterministic edges that come from actual sign-on events.

Some providers are presently pursuing use of machine learning algorithms to help form their identity graphs, but this usually involves running community detection algorithms to help cluster the graph instead of forming edge weights. These systems look at multiple users on shared devices (such as televisions) that are usually traced through IP addresses but not on MAIDs (such as appear on smartphones and tablets). Also, these attempts to solve this problem go towards adding in probabilistic edges where they predict a user could sign on to a device in the future, but they don't have evidence of that user on that device in the past. In various embodiments of the present invention, the system instead focuses on making full use of deterministic events, even for devices where there is a lot of noise.

It may be understood that while in certain embodiment the invention is directed to the association of PIDs and MAIDs in a graph data structure, the invention is not so limited. Any other identifier or datum may be used in place of MAIDs within this new data structure. For example, the invention in an alternative embodiment may be used with Internet browser cookies rather than MAIDs, in order to determine a user of a particular browser where multiple separate persons may be users of the device on which this browser operates.

An approach as represented by certain embodiments of the present invention is capable of uniting different types of identifiers like MAIDs, cookies, IP addresses, and PIDs to form a connected anonymous data graph structure with edge weights that are comparable across these different identifiers. If a different graph is created for each identifier, this would limit the ability to create accurate holistic representations of entities represented by data within these separate graphs. Downstream, the edge scores as utilized in certain embodiments of the present invention can be used to match entity data to destinations in a more intelligent way. Given that each edge now has a score, downstream systems can dynamically set a threshold value to reach the desired level of messaging reach across destinations while ensuring that the system prioritizes stronger edges.

These and other features, objects and advantages of the present invention will become better understood from a consideration of the following detailed description of the preferred embodiments and appended claims in conjunction with the drawings as described following:

DETAILED DESCRIPTION OF THE INVENTION

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Figure 1:
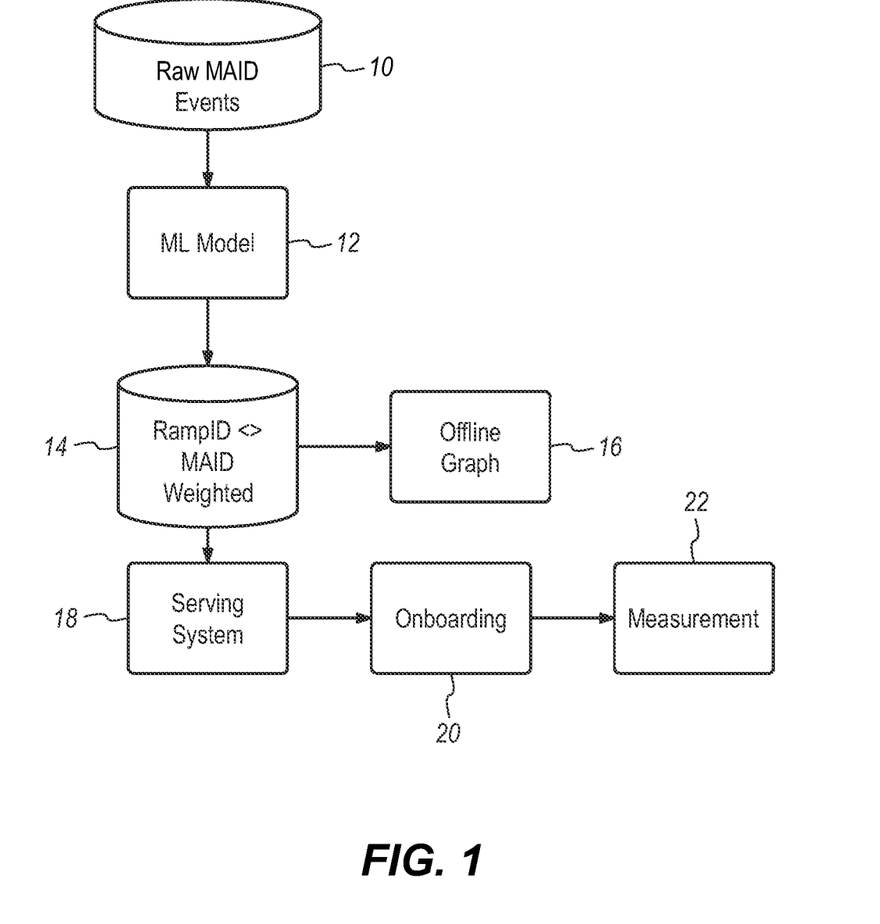
FIG. 1 is a flow diagram for an overview of a method according to an embodiment of the present invention.

FIG. 1 provides a high-level overview of a process according to an embodiment of the present invention. Processing begins with raw MAID events 10. These are indications that devices associated with particular MAIDs are in use in a particular timeframe. This data is fed to a machine learning model 12, the output of which is weights that map PIDs (such as the RampID® system from LiveRamp) to MAIDs, that is, weighting the likelihood of entities using a particular device during timeframes of interest. An offline resolution graph 16 is used in this process to provide a comprehensive source of PIDs. For production, this resulting data graph structure 14 with assigned weights is delivered to serving system 18. Data is onboarded at step 20 by the user in order to apply the resulting data graph structure to the user's particular dataset and production environment. Once applied, measurement 22 may be performed to determine the effectiveness of the use of data graph structure 14 in real-world conditions. The particulars of these steps will be described following.

Data Preparation System: Cleaning & Anonymization

Figure 2A:
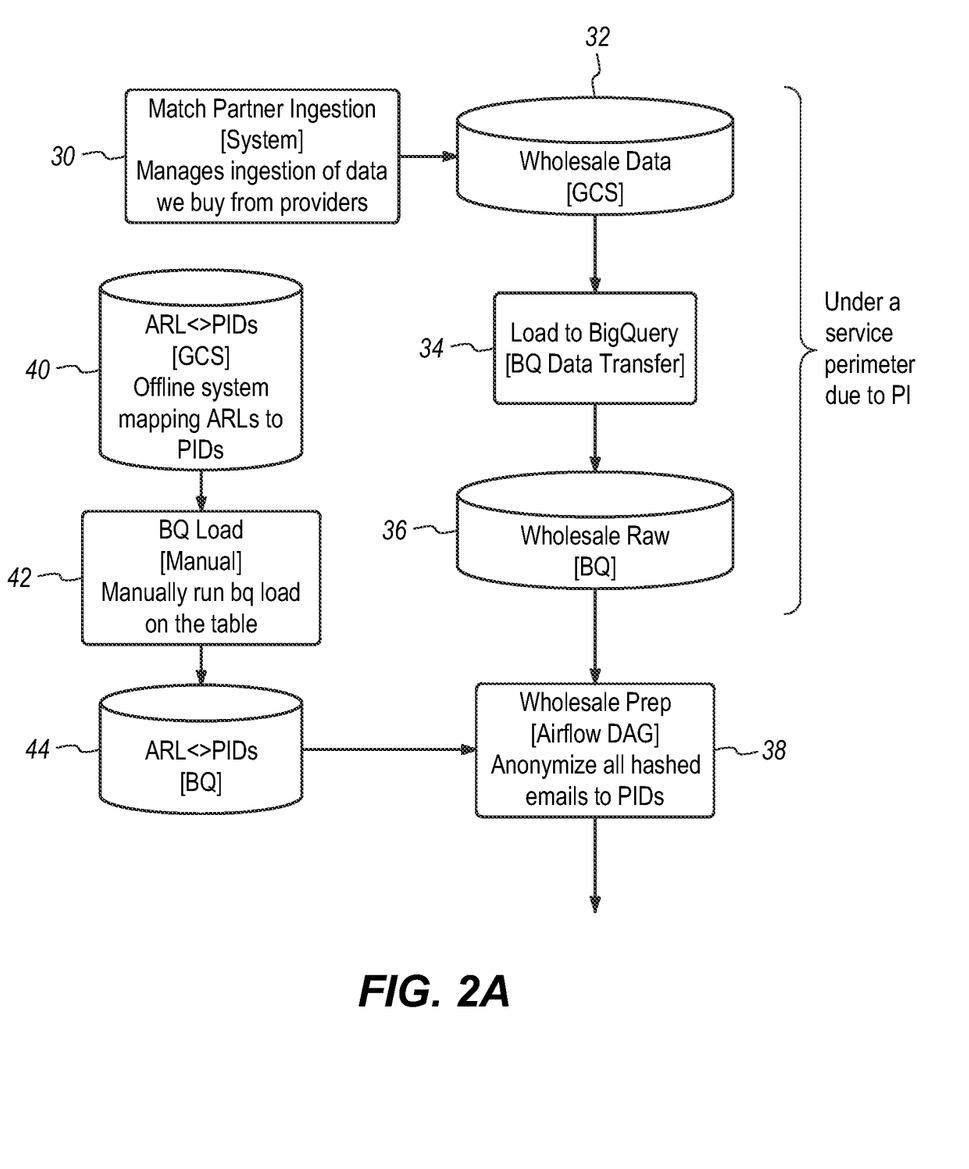
FIGS. 2A and 2B are first and second sections, respectively, of a flow diagram for a method of building a weighted MAID-to-PID data graph structure according to an embodiment of the present invention.

With reference now to FIG. 2A, a particular embodiment of the invention may now be described in detail up through data anonymization. The flow of data starts with the input data 30, utilizing the service provider's wholesale feed for mobile devices. This is data that may be, for example, bought from various data vendors and represents activity seen by a mobile device tied to a hashed email. Fields of the records within this data may include:

MAID—Mobile advertising ID
Device Type—Either IDFA (Apple) or AAID (Android)
UTC Timestamp—When the event was triggered
IP Address for the event
Hashed Email Address In an embodiment using Google® cloud services, data is transferred to a Google Cloud Storage bucket 32 in the Google Cloud Platform (GCP) using a proprietary data movement system created by the service provider. The data is then loaded into a BigQuery table as wholesale raw data 36 at load 34 using an Apache® Airflow directed acyclic graph (DAG) that runs daily. The DAG is responsible for moving the data from the bucket to the BigQuery table and deleting the original file. It will be readily apparent to a person of skill in the art that similar functions may be used in other cloud computing environments to achieve similar functionality; the Google cloud environment is used here only for illustration.

After the data is loaded, the Airflow DAG anonymizes the data at wholesale prep 38. First, any opt-outs and deletions that were saved are reapplied on the most recent version of the dataset to ensure that the system is compliant with applicable laws. Opt-outs are records indicating that persons have chosen not to have their personal data used for various purposes. Opt-out records are filtered out for the remainder of the processing.

Next, the hashed email is converted to an anonymous representation link (ARL), which is a salted hash of the hashed email. This step is performed in order to keep values unique but not tied to any personally identifiable information (PII). This is a one-way function, so the ARL may not be translated back to the original hashed email without the salt, which is used only for translation. The one-way nature of the function therefore serves to protect privacy.

Up until this point in the flow, the data has been protected using a GCP virtual private cloud (VPC) Network that has no egress out to the Internet, as noted in FIG. 2A. This is in order to better protect the hashed email from leaving the system. Using this approach, even if a hacker did get access into the system, the hacker wouldn't be able to export it using the network to somewhere outside of the service provider. This is achieved using firewall rules that deny all traffic outside of GCP.

The data is also protected by a perimeter using GCP's VPC Service Controls. This perimeter prevents exporting any data (including the hashed email data) to any projects that have not been explicitly listed by the developer. One of the exceptions is configured to allow exporting the ARL data to a different GCP project that isn't protected by VPC Service Controls. At this point there is no PII in the input data so the perimeter is no longer required.

In the next step, the ARL is compared to an ARL-to-maintained PID mapping file produced by the service provider's resolution system at ARL to PIDs step 40. The resolution system produces the service provider's offline graph using known identifiers, and this mapping file represents all of the hashed emails that the offline graph can recognize. The resolution system uses ARLs instead of hashed emails to reduce the risk of moving PII around different systems. This mapping files allows the system to map all ARLs that have a maintained PID to their respective PID.

The ARL to maintained PID mapping files are produced monthly (or on any other desired regular basis) as part of the resolution system's monthly build of the offline graph. There is a separate airflow DAG that will sense when new mapping files are dropped, and automatically load them to a BigQuery table to be used as part of this process. This file has a single PID for each ARL but several ARLs may be mapped to a single PID. This allows the system to use the resolution system's graph to combine multiple emails that a person may use into a single identifier. ARL-to-PID load step 42 leads to the loading of ARL-to-PID database 44, which feeds to wholesale prep 38.

Any ARLs that don't have a maintained PID are translated into derived PIDs using a secret domain key. This allows the service provider to form an identity around a hashed email (or ARL) even when that PII is not seen in the service provider's offline graph.

Data Preparation System: Feature Engineering

Figure 2B:
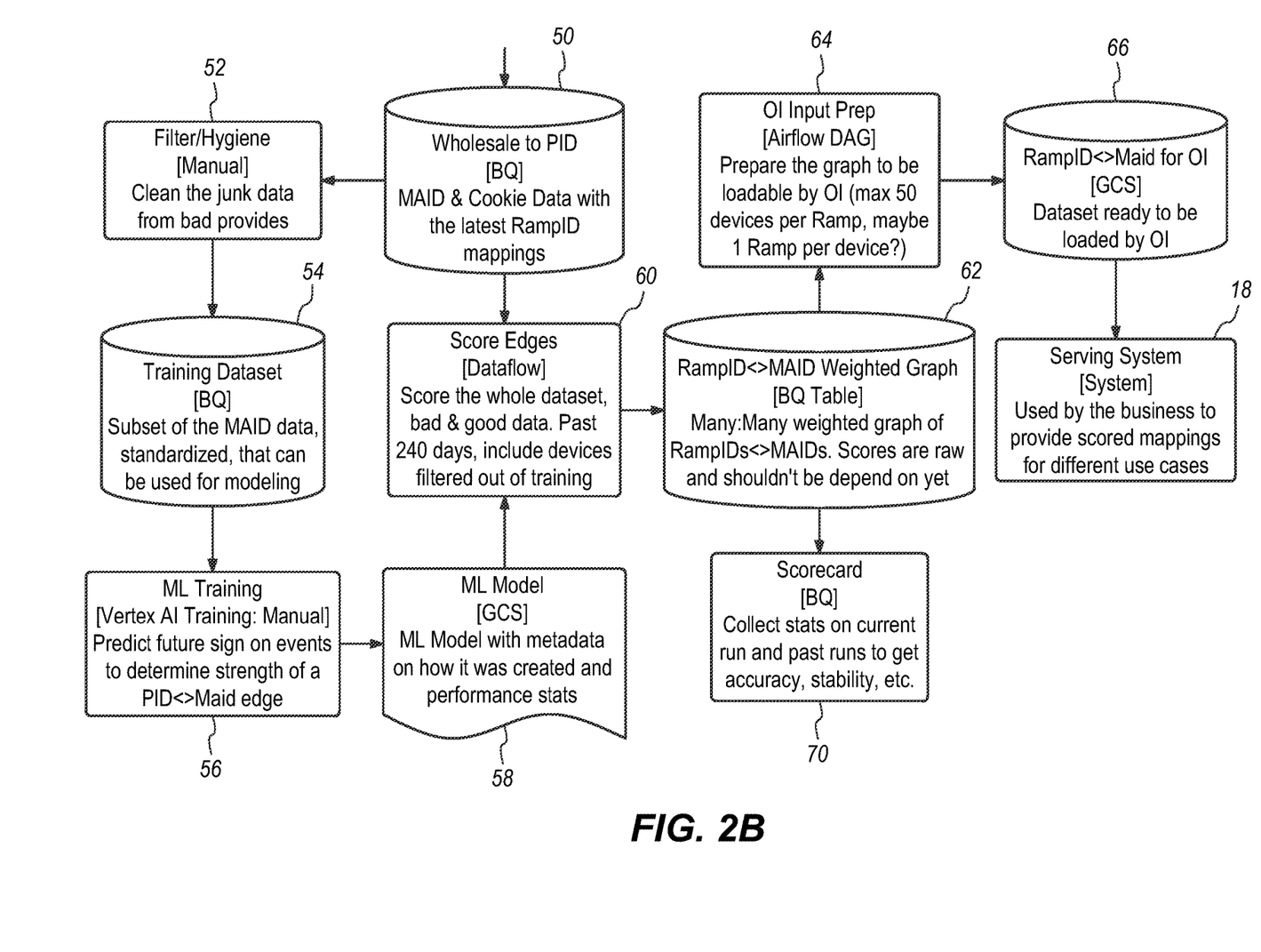

Referring now to FIG. 2B, the resulting dataset from the process flow described above is the same as the raw data, but instead of hashed email it has a PID column instead at wholesale-to-PID database 50. In addition, records that the system is prohibited from using due to privacy regulations or best practices are dropped. The result then is the following data fields:

MAID—Mobile advertising ID
Device Type—Either IDFA (Apple) or AAID (Android)
UTC Timestamp—When the event was triggered
IP Address for the event
PID Next, a certain number of days of this data are used to form various features that can be fed into a machine learning algorithm. In an example, the last 240 days of this data may be used in an embodiment. The system generates features based on a graph representation of these events, linking devices to IPs and hashed email and other devices. Features include the following:

1. weekly counts of activity for each of the most recent period, such as, for example, the last 35 weeks;
2. the percent ranking of a PID on a device, where ranks are based on activity/sign-on events, for the most recent 2, 4, 6, 8, 12, 16, 24, and 32 weeks, as examples;
3. the number of distinct devices associated with a PID for the most recent 2, 4, 6, 8, 12, 16, 24 and 32 weeks, as examples;
4. the number of PIDs associated with the device;
5. the time in days since the PIDs most recent activity/sign-on event;
6. the time in days since the PIDs first activity/sign-on event in the most recent 35 weeks, for example;
7. the percent rank of the PID for the device, where PIDs are ranked by the number of days since their last activity/sign-on event;
8. an indicator for an Apple device;
9. a number of distinct IP addresses associated with the PID and device; and
10. the minimum, maximum and average number of devices associated with the IP addresses that are associated with the PID.

These features can be used with the system's machine learning algorithm, to weight the edges of the MAID graph, or for other machine learning algorithms on this same dataset (such as weighing the relative importance of MAIDs per PID). First, filtering and/or data hygiene 52 may be performed to remove known junk data from unreliable data providers. A training dataset 54 is then constructed as a subset of the MAID data, which is fed to machine learning training 56. The training dataset is stored in a feature store using BigQuery. In an example, this takes about 100 GB of storage space compared to the 13 TB of the raw data it was created from. This is a more efficient approach that utilizes the raw data to train the machine learning algorithm and also has the added benefit of distilling important information to the algorithm so that it does not spend training cycles on unimportant raw information.

Model Training System

Before the system may be used for production, training must be performed in order to construct the data graph structure. In an embodiment, the Microsoft®-developed LightGBM machine learning algorithm may be used for machine learning training 56. The starting point for this process for inputting data into this machine learning algorithm is a pre-existing dataset matching MAIDs to PIDs 50, as just described above. This dataset only matches a single PID to each MAID, and contains no scores. The output of the training will be the desired data graph structure, wherein each node of the graph includes a MAID and each of the edges connecting the nodes within the graph is a single numerical probability/score.

Defining node-and-edge level features based on the input data represented as a graph, an input dataset in a particular embodiment has the sign-on event times associated with a hashed email on each device. The system defines features at the node level, such as when the MAID was first seen, when it was last seen, how often it has been seen, user agent details on the type of device, and other summary level data for the MAID. The system also defines features at the edge level between a MAID and a PID, such as how long (e.g., how many weeks) that PID was seen on the MAID, what time of day did sign-on events happen, and which Internet protocol (IP) addresses at which it was seen, as previously listed. The features are trained in machine learning algorithm 56 to predict which PID is most likely to be on the device the most in the near future; in one example, near future may be defined as four weeks. Historical data is used on this over various different time frames to reduce bias. After going through a hyperparameter tuning process, this creates a machine learning model 58 that translates the raw features into a single numerical score set 60 representing the strength of association between a MAID and a PID.

More specifically, the machine learning model 56 is responsible for weighting the edges between MAIDs and PIDs. The weight should represent how likely a PID is to be seen on a MAID in the near future (defined, in one example, over 4 weeks). To achieve this, a ranking machine learning model is used to rank the PIDs for each MAID. The data is split into separate training, test, and validation datasets over which to run the model, as described herein.

In a particular example, the LightGBM machine learning algorithm was used to rank the PIDs for each MAID by selecting 240 days of training data and comparing it to the future four weeks of data to measure the results, the results being scored edges 60. The training was done using Google Cloud Platform's Vertex AI Training by running a hyperparameter tuning job over the machine learning model 56 to achieve the best results. This job uses a GCP compute engine server with 96 cores and 624 GB of memory in order to train the model efficiently. The optimization function uses normalized discounted cumulative gain in order to correctly rank all PIDs for a MAID. Once this training system is complete, it produces a "best" machine learning model 58 that can be used to actually score edges between MAIDs and PIDs.

Model Serving System

On a daily basis, for example, the model may be used to recalculate the scores between PIDs and MAIDs using the latest data. This is done using a Google® Cloud Dataflow job that serves the model. This job uses GCP's compute engines to process the data, with a total of around 100 vCPU hours, 400 GB-hours of memory, and 1400 GB-hours of disk space, in a typical production example.

Downstream Systems and Use Cases

A main use case for this dataset is to maximize reach for the service provider's users while still allowing them to balance how accurate they want to remain, using PID-to-MAID-weighted graph 62 (in the illustrated example, the PIDs are provided by the LiveRamp RampID® service). For a particular service provider's data onboarding flow, where a user uploads data to be translated into PIDs that can be targeted in different destinations, the user can use this new dataset to return multiple PIDs per MAID. This will increase reach, i.e., the total number of entities who will receive a particular message sent by the user.

If the service provider's user does not want to maximize reach by including all PIDs per MAID, then the user can set different thresholds for the score value it wants to keep and only send messages to PIDs that are weighted highly for a MAID, using Input Prep 64. For some destinations, the system may estimate the impact of different score values on match rate, allowing the service provider's user to see estimated reach versus match rate metrics for different threshold values, at scorecard 70.

The scores from scorecard 70 can also be used to identify under-consolidation in the service provider's offline resolution graph. If two or more PIDs share a device, this provides further evidence that those PIDs represent the same entity. By sending the bundles of related PIDs back to the resolution graph (excluding MAID data that is anonymous data and cannot be mixed with offline data for privacy reasons), the system can further consolidate PIDs to have more fully defined identities. It can also be used to consolidate groups of entities, such as households of persons, where a similar under-consolidation problem exists. The result then is PID-to-MAID-for-user data graph 66. This dataset is loaded into serving system 18 for production use.

It will be understood that without an embodiment of the present invention as just described, i.e., the scores for the MAID to PID connections, the bundle of PIDs associated with a device would not be useful to the service provider's users or to the service provider's resolution system. Many of the PIDs associated with a device have only a loose correlation and may never be seen on that device again. The scores allow the users to filter out low-quality edges to focus on the core of the dataset that actually matters for various applications.

Figure 3:
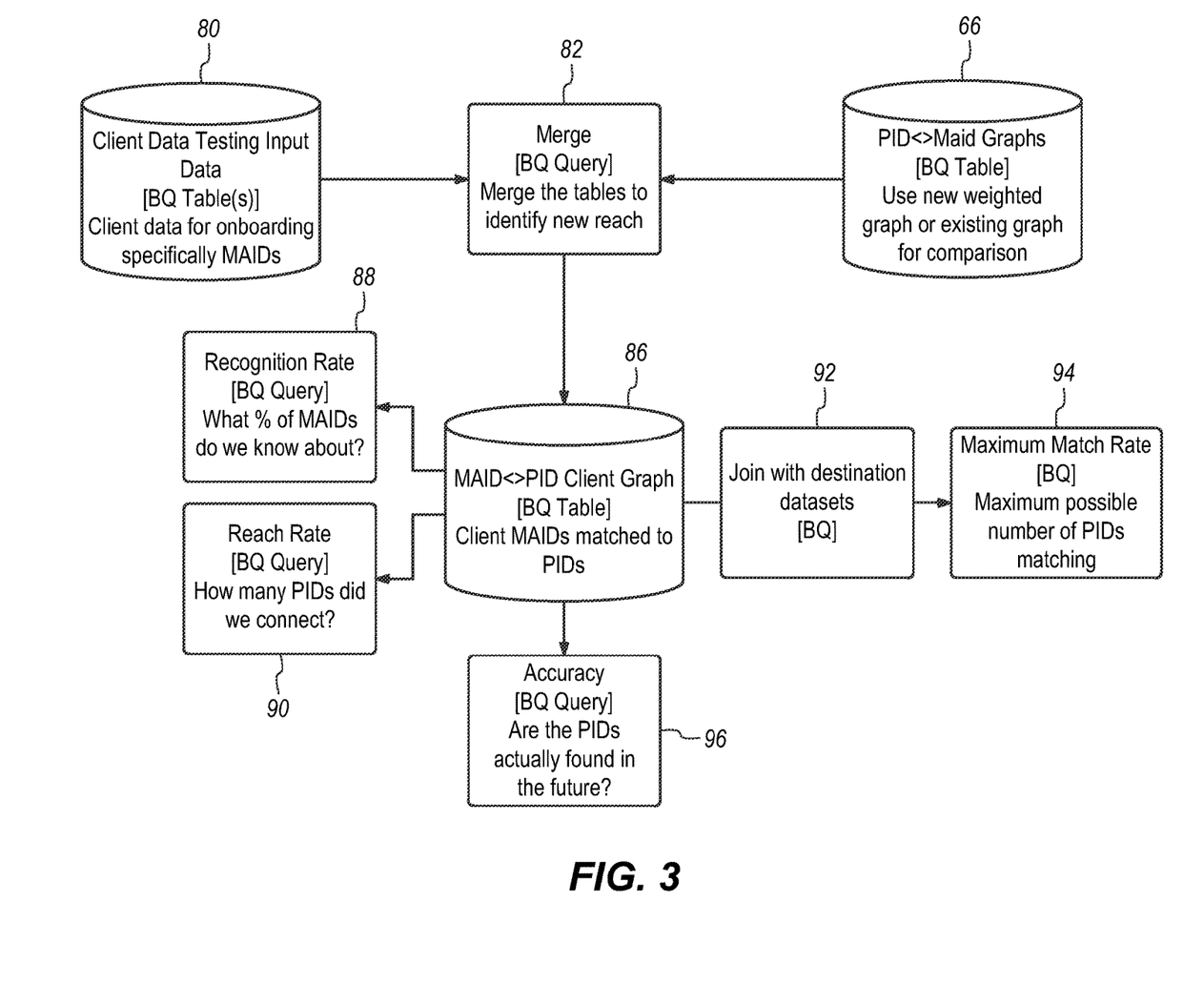
FIG. 3 is a flow diagram for a production system method according to an embodiment of the present invention.

Referring now to FIG. 3, the setting up and use of a production system employing the MAID-to-PID data graph structure may be described. Client (i.e., user) specific data 80 is merged with PID-to-MAID-for-user data graph 66 through onboarding 82 to create the client-specific MAID-to-PID graph 86. Various queries may be employed to determine parameters of this data graph, such as recognition rate 88 (i.e., what percentage of MAIDs does the user have data for); reach rate (i.e., how many of the PIDs does the user reach); and accuracy (i.e., looking at data resulting from future use, how many of the PIDs are actually found). At join 92 the client-specific MAID-to-PID graph 86 is jointed to existing user destination datasets, and a maximum match rate 94 is calculated based on the maximum possible number of PIDs matching with this combined dataset.

Figure 4A:
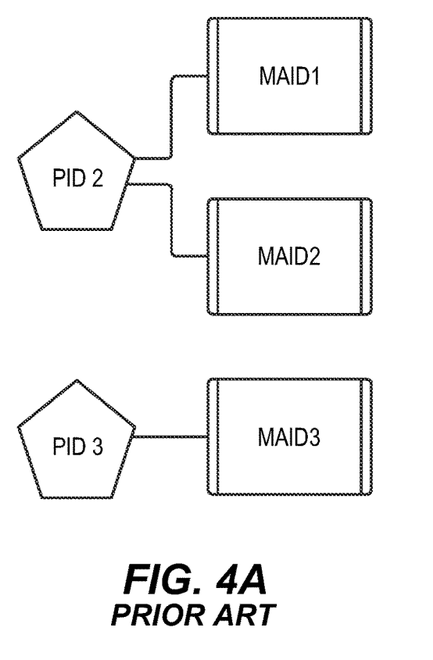
FIG. 4A is a diagram illustrating prior art mapping of PIDs to MAIDs.
Figure 4B:
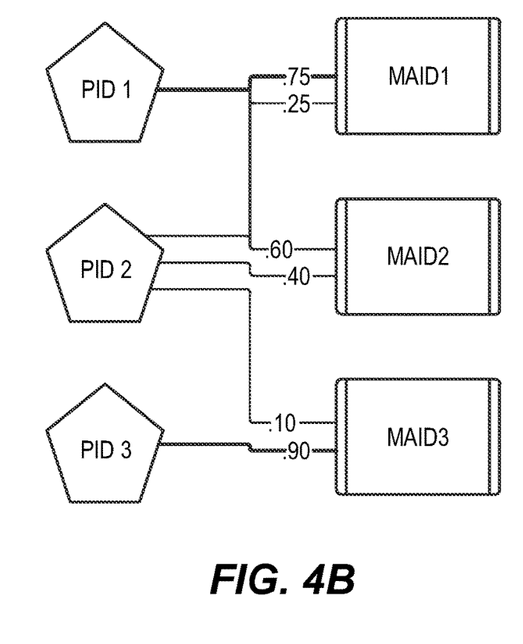
FIG. 4B is a diagram illustrating mapping of PIDs to MAIDs according to an embodiment of the present invention.

Utilizing this method as described, the difference in results can be visualized by comparing the prior art matching of FIG. 4A with the matching according to a particular exemplary embodiment of the invention of FIG. 4B. This is of course a simplification, as real-world implementations would include millions of PIDs and MAIDs. In the prior art result of FIG. 4A, each PID is matched to one or more MAIDs. In this particular example, PID 2 is matched to two MAIDs (i.e., a particular entity associated with PID 2 is associated with two devices used by that entity). By contrast, FIG. 4B shows that the relationships are understood in terms of weights or percentages. The entity associated with PID 1 is associated with, for example, a 0.75 correlation to MAID1 and a 0.60 correlation to MAID2. The entity associated with PID 3, by contrast, has a 0.90 correlation only to MAID 3. This much greater accuracy and understanding of the relationships between entities using devices and the devices themselves between FIGS. 4A and 4B allows the user to utilize the service provider's PID-to-MAID data graph to perform much more accurate messaging to these entities through devices associated with the MAIDs.

Orchestration System

Figure 5:
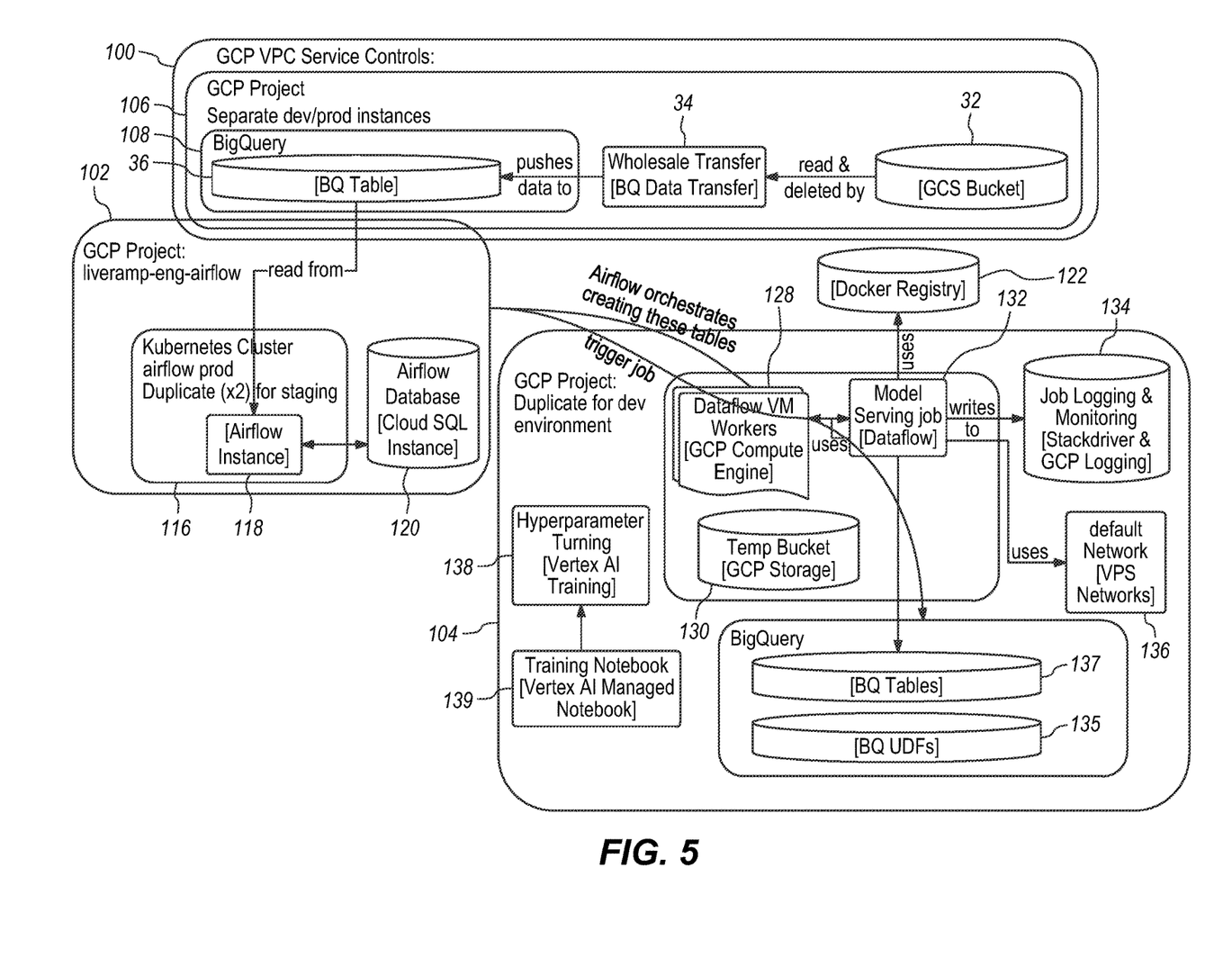
FIG. 5 is a diagram of a hardware implementation for performing the methods described herein according to an embodiment of the present invention.

The Airflow DAG as described herein is hosted on an airflow instance that is hosted on a Kubernetes cluster (built, in one example, using Google® Kubernetes Engine, and configured via Terraform code). There is a separate namespace to separate out this airflow instance from other airflow instances also hosted on this Kubernetes cluster. The airflow instance runs various DAGs to orchestrate workflows. For this invention, it has a DAG to load and clean the data, another DAG to apply optouts and deletion requests, and another DAG to generate the final scored MAID-to-PID dataset 66. The raw data is not processed within the Airflow system, allowing it to run outside the service perimeter environment. Instead, it simply orchestrates the data manipulation needed by submitting BigQuery queries to run within the service perimeter environment.

Referring now to FIG. 5 for discussion of this hardware arrangement in greater detail, a table transfer project 106 is spun up within a service controls environment 100. Google Cloud Storage bucket 32 is directed to the BigQuery table as wholesale raw data 36 at load 34, as noted above, with wholesale raw data 36 housed within the BigQuery environment 108. Airflow instance 188 within Kubernetes cluster airflow-prod, within a different GCP project for airflow 102, reads from wholesale raw data 36 using airflow database 120 as a cloud-based SQL instance. Airflow DAGs further communicate to a third GCP project for development environment 104. The virtual hardware to implement this environment may use model serving job 132, which uses dataflow workers 128 and writing to job logging and monitoring database 134. A temp bucket 130 may be used for temporary data storage during various parts of the method previously described. Model serving job 132 also uses a default network such as network 136. Model serving job 132 may read and/or write to BigQuery tables 137 (to implement various tables previously described in the method that are created by the airflow DAGs) and BigQuery user-defined functions 135 (to implement functionality previously described in the method). Docker registry 122 may also be used by model serving job 132. Machine learning training 56 may be implemented by hyperparameter tuning (Vertex AI training) 138, utilizing training notebook 139.

Figure 6:
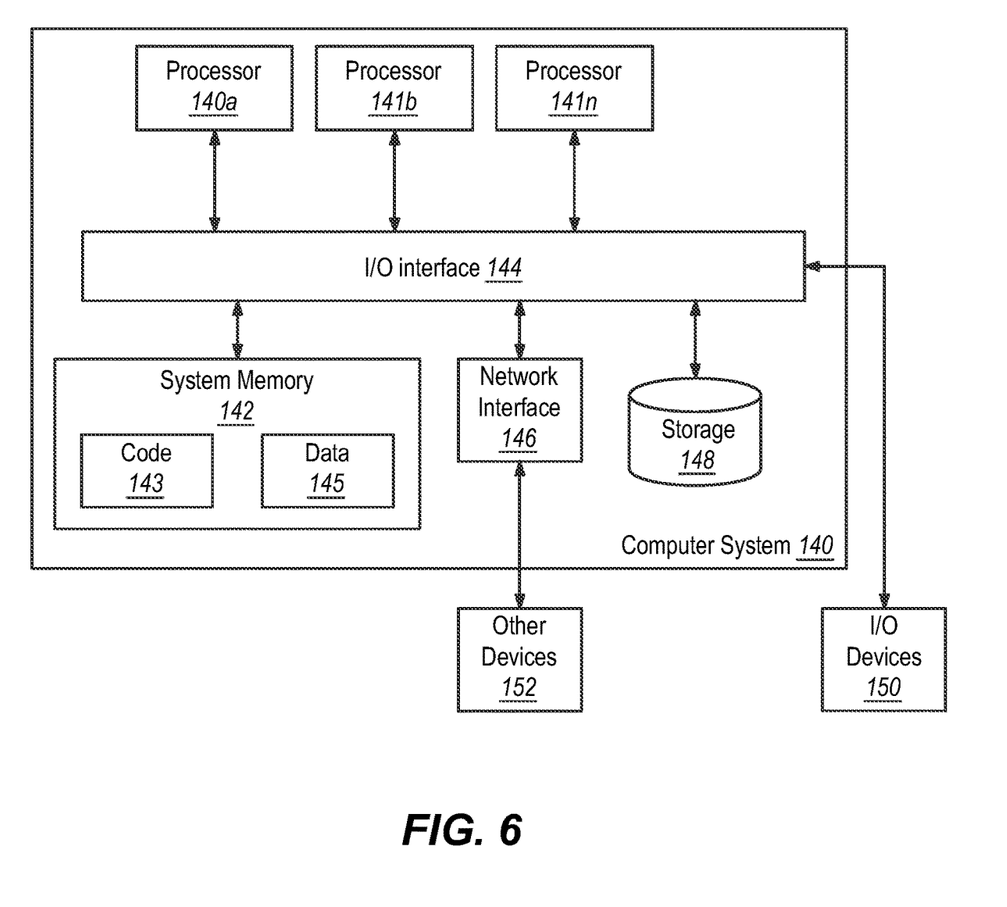
FIG. 6 is a diagram of a computer system as may be used to implement the hardware of FIG. 5 in an embodiment of the present invention.

The methods described herein may in various embodiments be implemented by any combination of hardware and software. For example, in one embodiment, the methods may be implemented by a collection of computer systems (e.g., computer systems each as shown in FIG. 6), each of which includes one or more hardware processors executing program instructions stored on a computer-readable physical storage medium coupled to the hardware processors. The program instructions may implement the functionality described herein (e.g., the functionality of various hardware servers and other components that implement the network-based cloud computing resources described herein). The various methods as illustrated in the figures and described herein represent example implementations. The order of any method may be changed, and various elements may be added, modified, or omitted.

FIG. 6 is a block diagram illustrating an example computer hardware system, according to various embodiments. Computer system 140 may implement a hardware portion of a cloud computing system, as forming parts of the various implementations of the present invention. Computer system 140 may be any of various types of hardware devices, including, but not limited to, a commodity server, mainframe computer system, workstation, network computer, application server, physical storage device, or in general any type of computing node, compute node, compute device, and/or hardware computing device.

Computer system 140 includes one or more hardware processors 140a, 141b . . . 141n (any of which may include multiple processing cores, which may be single or multi-threaded) coupled to a physical system memory 142 via an input/output (I/O) interface 144. Computer system 140 further may include a network interface 146 coupled to I/O interface 144.

In various embodiments, computer system 140 may be a single processor system including one hardware processor 141a, or a multiprocessor system including multiple hardware processors 141a, 141b . . . 141n as illustrated in FIG. 6. Processors 141a, etc. may be any suitable processors capable of executing computing instructions. For example, in various embodiments, processors 141a, etc. may be general-purpose or embedded processors implementing any of a variety of instruction set architectures.

In multiprocessor systems, each of processors 141a, etc. may commonly, but not necessarily, implement the same instruction set. The computer system 140 also includes one or more hardware network communication devices (e.g., network interface 146) for communicating with other systems and/or components over a communications network, such as a local area network, wide area network, or the Internet. For example, a client application executing on system 140 may use network interface 146 to communicate with a server application executing on a single hardware server or on a cluster of hardware servers that implement one or more of the components of the systems described herein in a cloud computing environment as implemented in various sub-systems. In another example, an instance of a server application executing on computer system 140 may use network interface 146 to communicate with other instances of an application that may be implemented on other computer systems.

In the illustrated embodiment, computer system 140 also includes one or more physical persistent storage devices 148 and/or one or more I/O devices 150. In various embodiments, persistent storage devices 148 may correspond to disk drives, tape drives, solid-state memory or drives, other mass storage devices, or any other persistent storage devices.

Computer system 140 (or a distributed application or operating system operating thereon) may store instructions and/or data in persistent storage devices 148, as desired, and may retrieve the stored instructions and/or data as needed. For example, in some embodiments, computer system 140 may implement one or more nodes of a control plane or control system, and persistent storage 148 may include the solid-state drives (SSDs) attached to that server node. Multiple computer systems 140 may share the same persistent storage devices 148 or may share a pool of persistent storage devices, with the devices in the pool representing the same or different storage technologies, including such technologies as described above.

Computer system 140 includes one or more physical system memories 142 that may store code/instructions 143 and data 145 accessible by processor(s) 141a, etc. The system memories 142 may include multiple levels of memory and memory caches in a system designed to swap information in memories based on access speed, for example. The interleaving and swapping may extend to persistent storage devices 148 in a virtual memory implementation, where memory space is mapped onto the persistent storage devices 148.

The technologies used to implement the system memories 142 may include, by way of example, static random-access memory (RAM), dynamic RAM, read-only memory (ROM), non-volatile memory, solid-state memory, or flash-type memory. As with persistent storage devices 148, multiple computer systems 140 may share the same system memories 142 or may share a pool of system memories 142. System memory or memories 142 may contain program instructions 143 that are executable by processor(s) 141a, etc. to implement the routines described herein.

In various embodiments, program instructions 143 may be encoded in binary, Assembly language, any interpreted language such as Java, compiled languages such as C/C++, or in any combination thereof; the particular languages given here are only examples. In some embodiments, program instructions 143 may implement multiple separate clients, server nodes, and/or other components.

In some implementations, program instructions 143 may include instructions executable to implement an operating system (not shown), which may be any of various operating systems, such as UNIX, LINUX, Solaris™, MacOS™, or Microsoft Windows™. Any or all of program instructions 143 may be provided as a computer program product, or software, that may include a non-transitory computer-readable storage medium having stored thereon instructions, which may be used to program a computer system (or other electronic devices) to perform a process according to various implementations.

A non-transitory computer-readable storage medium may include any mechanism for storing information in a form (e.g., software or processing application) readable by a machine (e.g., a physical computer). Generally speaking, a non-transitory computer-accessible medium may include computer-readable storage media or memory media such as magnetic or optical media, e.g., disk or DVD/CD-ROM, coupled to or in communication with computer system 140 via I/O interface 144. A non-transitory computer-readable storage medium may also include any volatile or non-volatile media such as RAM or ROM that may be included in some embodiments of computer system 140 as system memory 142 or another type of memory.

In other implementations, program instructions may be communicated using optical, acoustical or other form of propagated signals (e.g., carrier waves, infrared signals, digital signals, etc.) conveyed via a communication medium such as a network and/or a wired or wireless link, such as may be implemented via network interface 606. Network interface 146 may be used to interface with other devices 142, which may include other computer systems or any type of external electronic device.

In some embodiments, system memory 142 may include data store 145, as described herein. In general, system memory 142 and persistent storage 148 may be accessible on other devices 142 through a network and may store data blocks, replicas of data blocks, metadata associated with data blocks, and/or their state, database configuration information, and/or any other information usable in implementing the routines described herein.

In one embodiment, I/O interface 144 may coordinate I/O traffic between processors 141a, etc., system memory 142, and any peripheral devices in the system, including through network interface 146 or other peripheral interfaces. In some embodiments, I/O interface 144 may perform any necessary protocol, timing or other data transformations to convert data signals from one component (e.g., system memory 142) into a format suitable for use by another component (e.g., processors 141a, etc.).

In some embodiments, I/O interface 144 may include support for devices attached through various types of peripheral buses, such as a variant of the Peripheral Component Interconnect (PCI) bus standard or the Universal Serial Bus (USB) standard, as examples. Also, in some embodiments, some or all of the functionality of I/O interface 144, such as an interface to system memory 142, may be incorporated directly into processor(s) 141a, etc.

Network interface 146 may allow data to be exchanged between computer system 140 and other devices attached to a network, such as other computer systems (which may implement one or more storage system server nodes, primary nodes, read-only node nodes, and/or clients of the database systems described herein), for example. In addition, I/O interface 144 may allow communication between computer system 140 and various I/O devices 150 and/or remote storage 148. Input/output devices 150 may, in some embodiments, include one or more display terminals, keyboards, keypads, touchpads, scanning devices, voice or optical recognition devices, or any other devices suitable for entering or retrieving data by one or more computer systems 140. These may connect directly to a particular computer system 140 or generally connect to multiple computer systems 140 in a cloud computing environment, grid computing environment, or other system involving multiple computer systems 140.

Multiple input/output devices 150 may be present in communication with computer system 140 or may be distributed on various nodes of a distributed system that includes computer system 140. In some embodiments, similar input/output devices may be separate from computer system 140 and may interact with one or more nodes of a distributed system that includes computer system 140 through a wired or wireless connection, such as over network interface 146.

Network interface 146 may commonly support one or more wireless networking protocols (e.g., Wi-Fi/IEEE 802.11, or another wireless networking standard). Network interface 146 may support communication via any suitable wired or wireless general data networks, such as other types of Ethernet networks, for example. Additionally, network interface 146 may support communication via telecommunications/telephony networks such as analog voice networks or digital fiber communications networks, via storage area networks such as Fibre Channel SANs, or via any other suitable type of network and/or protocol.

In various embodiments, computer system 140 may include more, fewer, or different components than those illustrated in FIG. 6 (e.g., displays, video cards, audio cards, peripheral devices, or an Ethernet interface).

Any of the distributed system embodiments described herein, or any of their components, may be implemented as one or more network-based services in the cloud computing environment. For example, a read-write node and/or read-only nodes within the database tier of a hardware database system may present database services and/or other types of physical data storage services that employ the distributed storage systems described herein to clients as network-based services. In some embodiments, a network-based service may be implemented by a software and/or hardware system designed to support interoperable machine-to-machine interaction over a network.

A web service may have an interface described in a machine-processable format. Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol. To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a grouping is used herein, all individual members of the group and all combinations and subcombinations possible of the group are intended to be individually included. When a range is stated herein, the range is intended to include all sub-ranges within the range, as well as all individual points within the range. When "about," "approximately," or like terms are used herein, they are intended to include amounts, measurements, or the like that do not depart significantly from the expressly stated amount, measurement, or the like, such that the stated purpose of the apparatus or process is not lost. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A method for constructing a data graph structure for improving computational efficiency in digital messaging systems, comprising the steps of:
   receiving in a cloud computing environment a raw mobile ad identifier (MAID) feed, wherein the MAID feed comprises a plurality of MAID records each comprising a MAID and a hashed email address;
   storing the plurality of MAID records in the cloud computing environment with firewall rules that deny all traffic outside of the cloud computing environment;
   anonymizing the plurality of MAID records by converting the hashed email address in each of the plurality of MAID records to an anonymous representation link (ARL) using a one-way salted hash function that cannot be reversed without the salt;
   comparing the ARL in each of the plurality of MAID records to a maintained ARL to maintained personal identifier (PID) mapping file to create a wholesale-to-PID database comprising a plurality of records comprising a MAID and a corresponding PID;
   generating, with machine learning, features from the wholesale-to-PID database, including (i) counts of activity for recent time periods, (ii) percent ranking of PIDs on devices based on activity events, (iii) number of distinct devices associated with each PID, and (iv) timing data for PID activity events;
   extracting a portion of the wholesale-to-PID database as a training dataset and applying a machine learning algorithm to the training dataset to produce a MAID graph comprising a plurality of nodes and edges, wherein each of the plurality of nodes comprises a MAID or a PID, and each of the plurality of edges connecting a MAID node and a PID node represents a single numerical score predictive of which PID is most likely to be associated with such MAID in a near future period, wherein each MAID may be connected to a plurality of PIDs;
   wherein the MAID graph reduces computational processing requirements for downstream messaging operations, thereby enabling computationally feasible audience targeting.

2. The method of claim 1, wherein each of the MAID records further comprises a timestamp.

3. The method of claim 2, further comprising the step of filtering out opt-out records from the MAID records.

4. The method of claim 3, further comprising the step of producing the maintained ARL to maintained PID mapping file from a resolution system comprising a set of all recognized hashed emails.

5. The method of claim 4, wherein the maintained ARL to maintained PID mapping file is periodically updated using the resolution system.

6. The method of claim 5, further comprising the step of assigning a derived PID to any ARL that does not have a corresponding maintained PID in the resolution system.

7. The method of claim 6, wherein the portion of the wholesale-to-PID database comprises only those records generated during a set period within the wholesale-to-PID database.

8. The method of claim 7, further comprising the step of applying the machine learning algorithm to comparing the training dataset to a future set of collected data to measure results as scored edges.

9. The method of claim 8, further comprising the step of setting a user score threshold, and only sending a message to an entity corresponding to a PID if the score threshold is reached in the MAID graph.

10. The method of claim 9, further comprising the step of sending bundles of related PIDs back to the resolution system to improve the maintained ARL to maintained PID mapping file by consolidating PIDs related to the same entity.

11. A cloud-computing system for improving computational efficiency in digital messaging systems, the cloud-computing system comprising one or more computer processors and a memory space having instructions stored therein, the instructions, when executed by the one or more computer processors, causing the one or more computer processors to:
   receive at the cloud-computing system a raw mobile ad identifier (MAID) feed, wherein the MAID feed comprises a plurality of MAID records each comprising a MAID and a hashed email address;
   store the plurality of MAID records in the cloud computing system using firewall rules that deny all traffic outside of the cloud computing system;
   anonymize the plurality of MAID records by converting the hashed email address in each of the plurality of MAID records to an anonymous representation link (ARL) using a one-way salted hash function that cannot be reversed without the salt;
   compare the ARL in each of the plurality of MAID records to a maintained ARL to maintained personal identifier (PID) mapping file to create a wholesale-to-PID database comprising a plurality of records comprising a MAID and a corresponding PID;
   generate, with machine learning, features from the wholesale-to-PID database, including (i) counts of activity for recent time periods, (ii) percent ranking of PIDs on devices based on activity events, (iii) number of distinct devices associated with each PID, and (iv) timing data for PID activity events;

extract a portion of the wholesale-to-PID database as a training dataset and applying a machine learning algorithm to the training dataset to produce a MAID graph comprising a plurality of nodes and edges, wherein each of the plurality of nodes comprises a MAID or a PID, and each of the plurality of edges connecting a MAID node and a PID node represents a single numerical score predictive of which PID is most likely to be associated with such MAID in a near future period, wherein each MAID may be connected to a plurality of PIDs;

wherein the MAID graph reduces computational processing requirements for downstream messaging operations, thereby enabling computationally feasible audience targeting.

12. The cloud-computing system of claim 11, wherein each of the MAID records further comprises a timestamp.

13. The cloud-computing system of claim 12, wherein the instructions, when executed by the one or more computer processors, further cause the one or more computer processors to filter out opt-out records from the MAID records.

14. The cloud-computing system of claim 13, wherein the instructions, when executed by the one or more computer processors, further cause the one or more computer processors to produce the maintained ARL to maintained PID mapping file from a resolution system comprising a set of all recognized hashed emails.

15. The cloud-computing system of claim 14, wherein the instructions, when executed by the one or more computer processors, further cause the one or more computer processors to periodically update the maintained ARL to maintained PID mapping file using the resolution system.

16. The cloud-computing system of claim 15, wherein the instructions, when executed by the one or more computer processors, further cause the one or more computer processors to assign a derived PID to any ARL that does not have a corresponding maintained PID in the resolution system.

17. The cloud-computing system of claim 16, wherein the portion of the wholesale-to-PID database comprises only those records generated during a set period within the wholesale-to-PID database.

18. The cloud-computing system of claim 17, wherein the instructions, when executed by the one or more computer processors, further cause the one or more computer processors to apply the machine learning algorithm to compare the training dataset to a future set of collected data to measure results as scored edges.

19. The cloud-computing system of claim 18, wherein the instructions, when executed by the one or more computer processors, further cause the one or more computer processors to set a user score threshold, and only send a message to an entity corresponding to a PID if the score threshold is reached in the MAID graph.

20. The cloud-computing system of claim 19, wherein the instructions, when executed by the one or more computer processors, further cause the one or more computer processors to send bundles of related PIDs back to the resolution system to improve the maintained ARL to maintained PID mapping file by consolidating PIDs related to the same entity.

\* \* \* \* \*